May 22, 1951     O. J. ZANDER     2,553,622
SIGNAL AND SEARCHLIGHT SHUTTER
Filed Aug. 21, 1947     2 Sheets-Sheet 1
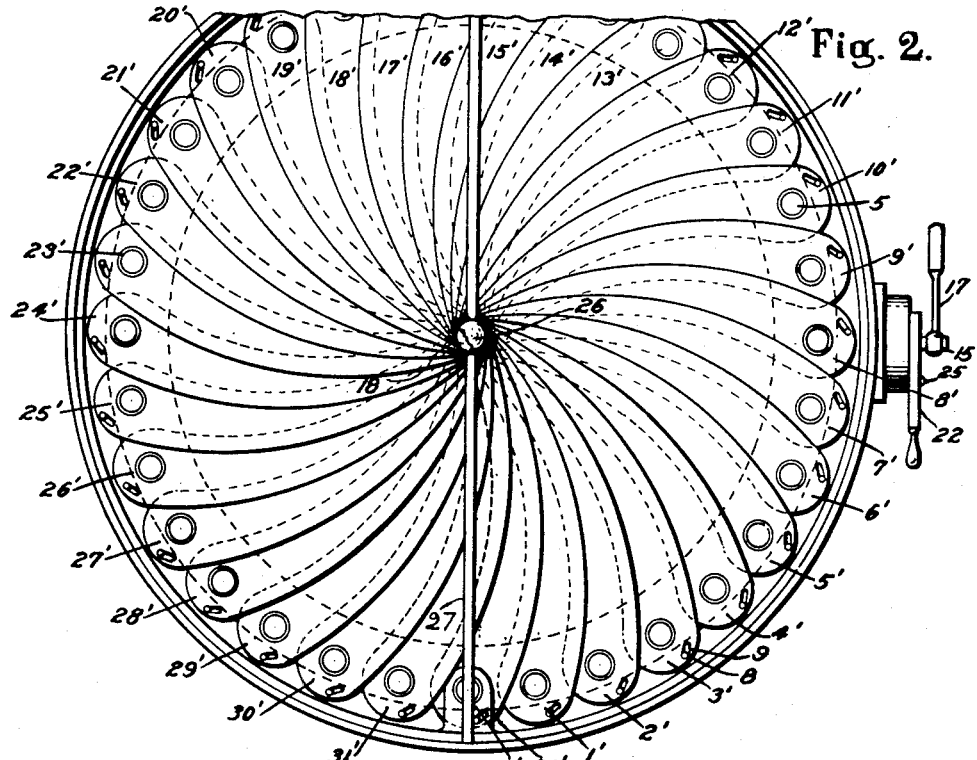
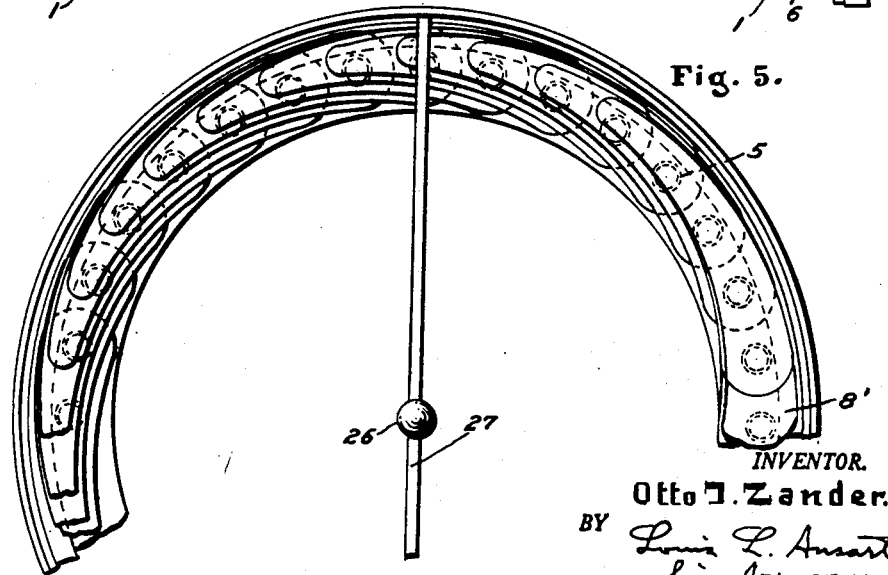
INVENTOR.
Otto J. Zander.
BY Louis L. Ansart
his Attorney May 22, 1951      O. J. ZANDER      2,553,622
SIGNAL AND SEARCHLIGHT SHUTTER
Filed Aug. 21, 1947      2 Sheets-Sheet 2
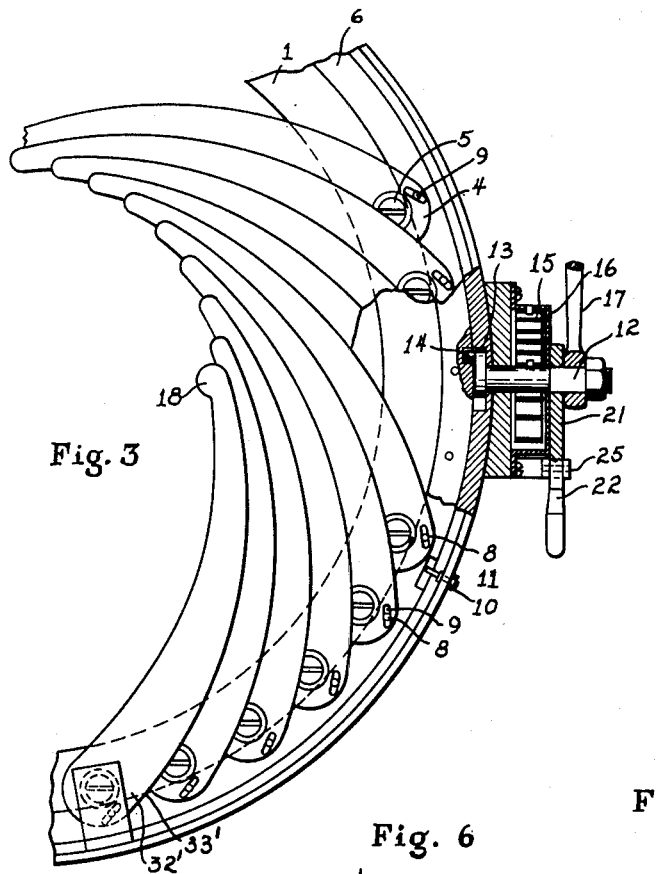
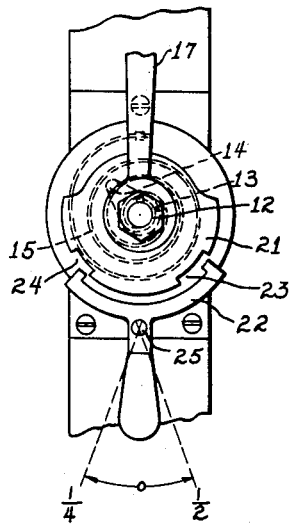
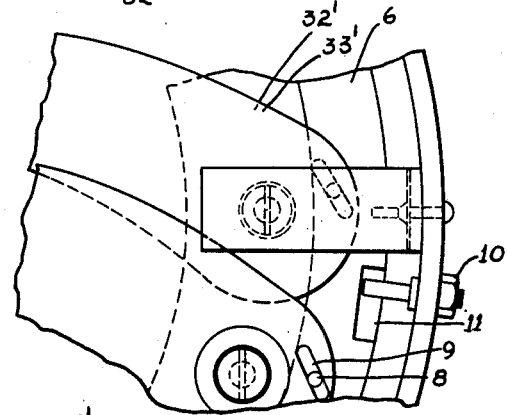
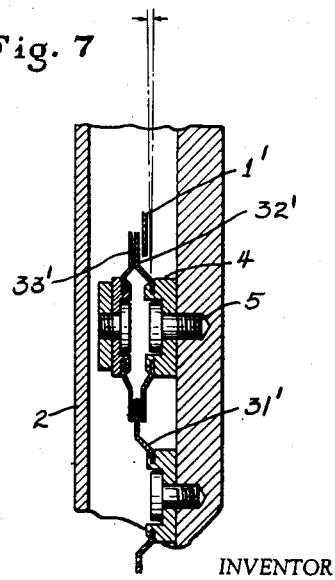
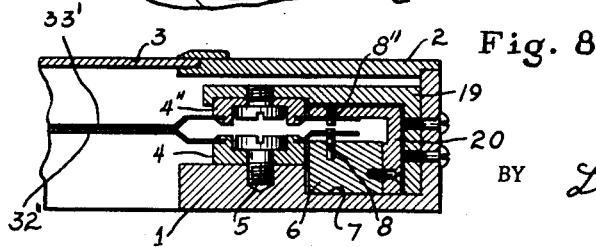
INVENTOR
Otto J. Zander
BY Louis L. Ansart
ATTORNEY Patented May 22, 1951

2,553,622

UNITED STATES PATENT OFFICE 2,553,622

SIGNAL AND SEARCHLIGHT SHUTTER

Otto J. Zander, Huguenot, N. Y.

Application August 21, 1947, Serial No. 769,818

6 Claims. (Cl. 88—61)

An object of the present invention is to provide a novel and advantageous shutter construction wherein the shutter operating mechanism itself will not obstruct the passage of light beams.

Another object of the invention is to provide a novel and advantageous shutter construction wherein opening the shutter will involve movement of all movable light-obstructing shutter parts out of position to obstruct the passage of light beams.

According to an embodiment of the present invention, the shutter comprises a plurality of vanes or blades with relatively broad outer ends pivoted on an aperture ring, and narrow inner ends. The vanes are inclined sidewise so that one edge of each vane overlies the adjacent edge of the next vane on that side. When the vanes are opened to their greatest extent each vane completely overlies an adjacent vane on one side and underlies the next vane on the other side.

When said vanes are closed there is a slight opening at the center and this may be closed by pivoting another vane on said aperture ring so that it will pass outside of all the other vanes and in the closing movement thereof will position a disk on the outer end thereof over the central opening enclosed by the ends of said vanes.

In order to protect the shutter from damage due to shock, such as those resulting from explosions of shells, there may be a central disk suspended by rods secured to the aperture rings at opposed positions. This arrangement serves to prevent undue outward movement of the inner ends of said vanes resulting from such shocks. If desired, the stationary disks may be large enough to shut off all light at the centre of said shutter when closed.

Other objects, features and advantages will appear upon consideration of the following detailed description and of the drawings in which:

Fig. 1 is a section taken through the centre of the structure of Fig. 2;

Fig. 2 is a front view of the shutter with the outside aperture plate removed;

Fig. 3 is a fragmentary view on a larger scale of structure shown in Fig. 2;

Fig. 4 is a fragmentary view of a device for controlling the shutter;

Fig. 5 is a fragmentary view corresponding to Fig. 2, with the vanes in open position;

Fig. 6 is a fragmentary view on a larger scale showing a part of Fig. 2;

Fig. 7 is a fragmentary section illustrating the sidewise tilting of a blade; and Fig. 8 is a sectional view taken centrally across the structure of Figs. 6 and 7.

Referring to the drawings, there is disclosed a shutter which may be applied to a searchlight of any suitable construction, and includes an apertured base ring 1 having at its outer edge a cylindrical flange and an annular groove just inside said flange, the top of ring 1 at the inner side of the groove constituting a high part and the bottom of the groove constituting a low part of the ring. Mounted on the edge of said flange is an apertured front plate 2 and a glass plate 3 mounted on said front ring (Fig. 8). The base ring 1 supports the vanes of which thirty-three are shown in the present embodiment of the invention.

Thirty-two of said vanes are arranged in a circular series and are numbered from 1' through 32'. Vane 33' is at the outside of vane 32'. In order that the numbers applied to the vanes may not be confused with reference characters applied to other parts, the vane numbers are primed. Each of the vanes 1' through 32' is fixed on a flange bushing or washer 4 constituting a bearing portion, as by riveting or welding, and each bushing or washer is mounted on a pivot 5 secured to the high inner part of ring 1 (Figs. 7 and 8).

As shown (Figs. 7 and 8), each washer 4 is made in such a way that the vane-carrying face is inclined with reference to the other face and each vane is mounted on the corresponding washer so that it is always inclined sidewise. It will be evident that the vanes are sufficiently flexible to adjust themselves to each other when the shutter is closed or when it is open and the vanes are piled on top of each other.

All of the vanes 1' through 32' are swung about their pivots 5 by an actuating or action ring 6 at the inside of groove 7 (Fig. 8) in ring 1. Mounted in ring 6 at regular intervals in a circle concentric with the ring, are pins 8 corresponding in number to vanes 1' through 32' and projecting into slots 9 suitably located in the ends of said vanes outside of the pivots 5.

Obviously, an oscillating movement of said ring 6 will move said pins 8 accordingly. In such movements pins 8 will slide back and forth in slots 9 and swing said vanes toward and from their limiting open and shut positions. Movement of the ring 6 back and forth is limited by suitable means. To this end, a pin 10 secured in the flange at the outer edge of ring 1, projects inwardly into a slot 11 in the outer edge of action ring 6. Movement of ring 6 is therefore limited by the length of the slot 11.

The action ring 6 may be shifted by any suitable means which may include (Figs. 3 and 4) a shaft 12 with a crank and a crank pin 13 projecting into a slot 14 in the outer edge of said actuating or action ring 6 and arranged parallel to the axis of said ring.

A spring 15 has one of its ends secured to a housing 16 fixed with respect to ring 1, and the other end to shaft 12, and normally tends to turn shaft 12, and also the crank and pin 13 in clockwise direction. This urging by spring 15 tends to move the action ring 6 to its Fig. 2 position with all of the vanes 1' through 32' in closed position.

Movement of the vanes to open position may be effected by turning the shaft 12 in counter-clockwise direction and through crank and pin 13, turning ring 6 to its Fig. 3 position and shifting all of the vanes 1' through 32' to open position. The turning of shaft 12 against the action of spring 15 may be effected by suitable means such as an arm or lever 17 secured to said shaft.

The vane 33' is similar to vanes 1' through 32' except that at its free end it has an extension or disk 18 to cover the small central opening left when the vanes 1' through 32' are in their closed position. Vane 33' is provided with a washer or hub 4'' mounted on a pivot secured to a bracket 19 carried by ring 1 and is actuated by a pin 8'' mounted on a bracket 20 fixed on action ring 6.

Signalling may be effected by use of smaller and larger apertures at the center of the shutter. To this end use is made of a segment 21 cooperating with a lever 22 mounted centrally on a fixed pivot. Said segment has two notches 23 and 24 in a circular part of its edge, and said lever 22 has, adjacent segment 21, arms extending in opposite directions along the edge of the disk or segment 21 and having at their ends teeth to engage in said notches 23 and 24. By means of lever 17 on shaft 12, the shaft 12 and segment 21 may be turned in a counter-clockwise direction to open the shutter against the action of spring 15.

To determine opening of the aperture to one-quarter of its full size, the handle of lever 22 may be urged to the left (Fig. 4) and when the segment 21 reaches the proper position for one-quarter opening the left end of the lever will enter notch 24 and stop the movement of the segment. Further movement of the segment will be made possible by swinging the lever 22 about its pivot 25 in a counter-clockwise direction to move the other end into notch 23, the movement of the segment being stopped for a one-half aperture by engagement of the left end of recess 23 with the right end of lever 22. With the handle of lever 22 in its middle position the aperture can be opened to full size.

It is necessary to avoid distortion of the vanes through forces resulting from internal shock and heavy impacts under battle and other conditions involving the use of signal lights and searchlights. To this end a small center disk 26 is mounted in position at the front of the position assumed by the inner ends of the vanes when in closed position. Said disk 26 may be supported by one or more rods 27 which may be secured to the flange at the outer edge of ring 1. In closed position the inner ends of all vanes 1' through 33' are back of disk 26.

The pivotal mounting of the vanes 1' through 32' has been described specifically as obtained by the use of pivots 5 perpendicular to ring 1 and arranged in a circle around the circular aperture of member or ring 1, and washers 4 on said pivots 5 and having inclined upper faces against which said vanes are secured so that the vanes are tilted sidewise and an edge of each vane overlies an adjacent edge of a vane at one side thereof and underlies an adjacent edge of a vane at the other side thereof. This part of the invention is, however, broad enough to cover any pivotal mounting whereby each vane turns about an axis perpendicular to the ring 1 and has a sidewise inclination with respect to the axis.

It should be understood that various changes may be made and that certain features may be used without others, without departing from the true scope and spirit of the invention.

What is claimed is:

1. A signal and searchlight shutter comprising a plate with an aperture therein, a plurality of flat vanes, means for mounting said vanes to turn on individual axes perpendicular to said plate and in sidewise inclined positions with reference to said axes so as to overlap, said axes being spaced at regular intervals around said aperture, operating means for swinging said vanes back and forth between closed and open positions, and a stationary disk held in central position with reference to said aperture in said plate and supporting the inner ends of said vanes when closed against outward pressure.

2. A shutter for a searchlight and the like comprising an apertured plate, a plurality of circularly arranged and uniformly spaced pivots projecting from a face of said plate around the aperture therein, sidewise inclined vanes mounted on said pivots in overlapped relation, operating means for swinging said vanes between closed and open position, and a stationary disk in said shutter to cover the small central aperture left open between closed vanes and to support against outward pressure the inner ends of closed vanes.

3. A shutter for a searchlight and the like comprising an apertured plate, a plurality of circularly arranged and uniformly spaced pivots projecting from a face of said plate around the aperture therein, sidewise inclined vanes mounted on said pivots in overlapped relation, operating means for swinging said vanes between closed and open position, an additional vane carrying at its outer end a shield to cover the small central aperture left by the aperture-closing vanes, and means connecting said operating means to said additional vane to move it to and from its effective position.

4. A shutter for a searchlight and the like comprising an apertured ring having an annular high portion at its inner edge, a low portion outside of said high portion and a cylindrical casing at its outer edge, a circular series of equally spaced pivots projecting upwardly from said high portion, a plurality of vanes mounted on said pivots and having slots in their base portions outside said pivots, an action ring on said low portion and fitting around said high portion, a series of pins projecting upwardly from said action ring and into the slots of said vanes, means for shifting said ring including a groove across its edge, a shaft extending through said casing and provided with an eccentric pin projecting into said groove, means at the outside of said casing to operate said shaft, means to limit the turning of the action ring, a spring device to turn said shaft and move said action ring to one limit of its movement, a handle on said shaft and means to indicate the degree of opening of said shutters.

5. A shutter for a searchlight and the like comprising an apertured ring having an annular high portion at its inner edge, a low portion outside of said high portion and a cylindrical casing at its outer edge, a circular series of equally spaced pivots projecting upwardly from said high portion, a plurality of vanes mounted on said pivots and having slots in their base portions outside said pivots, an action ring on said low portion and fitting around said high portion, a series of pins projecting upwardly from said action ring and into the slots of said vanes, means for shifting said ring including a groove across its edge, a shaft extending through said casing and provided with an eccentric pin projecting into said slot, means at the outside of said casing to operate said shaft, means to limit the turning of the action ring, a spring drum to turn said shaft in a direction to close the shutter, a notched segment fixed on said shaft and a centrally pivoted lever with toothed ends which when swung in one direction will enter a notch in said segment to limit the opening of the shutter to a predetermined extent and movement in the opposite direction will limit the opening to another predetermined extent.

6. A shutter for a searchlight and the like comprising an apertured ring having an annular high portion at its inner edge and a low portion outside of said high portion, a circular series of equally spaced pivots projecting upwardly from said high portion, a plurality of vanes mounted on said pivots and having slots in their base portions outside of said pivots, an actuating ring on said low portion and fitting around said high portion, a series of pins projecting upwardly from said actuating ring into said slots, means for moving said actuating ring to swing said vanes between closed and open positions, a bracket attached to said apertured ring and having a part projecting inwardly over said high portion, a pivot projecting from said bracket toward said high portion, an additional vane mounted on said pivot and having a slot in its base, a second bracket extending upwardly from said action ring and across the base of said additional vane and a pin projecting from said bracket into the slot in said additional vane.

OTTO J. ZANDER.

REFERENCES CITED

The following references are of record in the file of this patent:

UNITED STATES PATENTS

| Number | Name | Date |
|---|---|---|
| 622,592 | Berger | Apr. 4, 1899 |
| 798,595 | Brueck | Sept. 5, 1905 |
| 1,037,402 | Zehendner | Sept. 3, 1912 |
| 1,678,179 | Brueck | July 24, 1928 |
| 1,750,830 | Wollensak | Mar. 18, 1930 |
| 2,015,491 | Merte | Sept. 24, 1935 |
| 2,168,893 | Aiken | Aug. 8, 1939 |
| 2,336,119 | Nettesheim | Dec. 7, 1943 |
| 2,356,178 | Poynter | Apr. 22, 1944 |
| 2,439,330 | Zander | Apr. 6, 1948 |

FOREIGN PATENTS

| Number | Country | Date |
|---|---|---|
| 23,399 | Great Britain | Nov. 7, 1898 |
| 162,829 | Great Britain | May 12, 1921 |
| 371,188 | Germany | Mar. 2, 1923 |
| 605,721 | Germany | Nov. 16, 1934 |